United States Patent
Nasli-Bakir et al.

(10) Patent No.: US 6,458,417 B2
(45) Date of Patent: Oct. 1, 2002

(54) METHOD OF GLUING

(75) Inventors: Benyahia Nasli-Bakir, Saltsjo-Boo; Lars Olsson, Tyreso, both of (SE)

(73) Assignee: Akzo Nobel N.V., SB Arnhem (NL)

( * ) Notice: Subject to any disclaimer, the term of this patent is extended or adjusted under 35 U.S.C. 154(b) by 0 days.

(21) Appl. No.: 09/898,453

(22) Filed: Jul. 5, 2001

Related U.S. Application Data

(60) Provisional application No. 60/217,109, filed on Jul. 10, 2000.

(30) Foreign Application Priority Data

Jul. 7, 2000 (EP) ............................................. 00114646

(51) Int. Cl.$^7$ ................................................. B05D 1/40
(52) U.S. Cl. ....................... 427/345; 427/420; 427/434.2
(58) Field of Search ................................. 427/345, 420, 427/434.2

(56) References Cited

U.S. PATENT DOCUMENTS

| | | | |
|---|---|---|---|
| 3,905,329 A | 9/1975 | Cone et al. ................. | 118/602 |
| 4,407,431 A | 10/1983 | Hutter ............................ | 222/1 |
| 5,899,563 A | 5/1999 | Karras ...................... | 366/152.3 |
| 6,045,616 A | 4/2000 | Williamson ................. | 118/301 |

FOREIGN PATENT DOCUMENTS

| | | |
|---|---|---|
| EP | 0095678 | 12/1983 |
| EP | 0362742 | 4/1990 |
| EP | 0366944 | 5/1990 |
| JP | 59015472 | 1/1984 |

OTHER PUBLICATIONS

Patent Abstracts of Japan of JP 59015472, 1984. (No month avail.).

*Primary Examiner*—Bernard Pianalto
(74) *Attorney, Agent, or Firm*—David J. Serbin

(57) ABSTRACT

The invention relates to a method of applying a multi-component glue mixture to objects passing through an applicator station for the application of said glue mixture in a manufacturing line. Waste glue mixture is produced during the application of said glue. The method comprises mixing glue components in a mixer to form said glue mixture. The waste glue mixture is collected in a tank, where it is mixed with a fresh glue component to form a mixture. The mixture of waste glue mixture and fresh component is returned to said mixer. A multi-component glue applicator machine (3) according to the invention comprises storage tanks (4, 6) for glue component, day tanks (17, 18) for said glue components, and mixing apparatus (38, 40, 42) for mixing glue components from said day tanks (17, 18) to form a glue mixture thereof. There is provided a glue applicator device (44). One of said day tanks (17) is provided beneath the glue applicator (44).

8 Claims, 2 Drawing Sheets

METHOD OF GLUING

This application claims priority from Provisional application Ser. No. 60/217,109, filed Jul. 10, 2000.

The present invention relates to a method and a machine for the application of glue, in particular for the continuous production of glued objects.

BACKGROUND OF THE INVENTION

Gluing is a wide spread method of joining diverse objects to form products. Perhaps in particular in connection with the production of laminated wood structures, efficient gluing is crucial in order to achieve high quality and economic production.

Oftentimes two-component glues are employed. Such glues comprises a first "glue" component and a second "hardener" component. These components must be adequately mixed before they are applied onto the surface of the object that is to be joined with another object to form a composite or laminated structure, such as a construction beam.

There are many known systems and methods for the mixing of glue and hardener, and for the subsequent application of the mixture. However, there are only two major types of machines for this purpose.

In the first type of machine glue and hardener is pumped from storage, mixed in a mixing device, from which it is pumped to an adjacent applicator machine. The application is carried out intermittently, i.e. it starts when the object enters and stopS when it exits the applicator station of the machine. When the next piece of material enters it begins applying glue mixture again. A position sensor such as a photo-cell indicates when the object enters the machine and thus triggers the start of application. The same position sensor indicates when the object leaves the machine, and triggers the interruption of glue application, after an appropriate time delay. It is also possible to use two position sensors.

In the second type of machine glue and hardener is first mixed in a mixing apparatus, and then mixture is circulated in an application machine. The mixture is fed to an applicator where it is expelled continuously. Thus, between the objects undergoing glue application the glue mixture will trickle down and be collected in a vessel containing circulating glue mixture. Thus, the glue that is collected in this way will ultimately be fed back into the system again.

In both types of machine (and in general for any known method of application) there is always some waste of glue mixture. The magnitude of the waste differs and depends on several factors, but the main factor affecting the waste is the time needed for the material onto which glue is to be applied, to pass through the applicator machine.

In the first type of machine the applicator will begin to expel or output the glue mixture slightly before the material enters the applicator, and will stop to output the mixture slightly after the material exits the applicator.

In the second type of machine, waste during manufacture occurs to the fact that the continuous supply of glue mixture will cause some mixture to adhere to the end surfaces of the material, where no glue should be applied. However, since in this machine type the mixture is circulated, the waste will instead be dependent on the so called "pot life" of the glue mixture. The "pot life" is the time a glue mixture (glue and hardener) can be used before the viscosity becomes too high to be applied, because of the polymerization process that takes place.

Therefore, if the pot life is short, it will become necessary to stop the production and clean the system from hardened glue, which causes costly stoppages in the manufacturing line, and also leads to considerable amounts of wasted glue.

As an example of the amount of glue that is wasted, consider the following example of manufacture of a laminated beam, where a machine of the first type is used. The beam consists of a number of lamellas, each lamella being 150 mm wide and 14 m long. The glue amount that is used is 400 g/m$^2$, and the waste at start and stop is 15 g. In this case the waste will be 3.6%. If the lamella is shorter, say 3 m, which is not uncommon, the waste will be as much as 12.5%.

On a yearly basis the total waste of glue in a manufacturing facility for construction beams, can amount to 5–10 tons of glue.

SUMMARY OF THE INVENTION

Thus, there exists a clear need to improve the methods and apparatuses used for applying glue in the manufacture of laminated or composite objects, such as construction beams, window frames, doors, block-boards for furniture etc.

The object of the present invention is therefore to provide a method and an apparatus for the application of glue where the waste of glue is minimized and preferably eliminated. This object is achieved with the method defined in claim 1, and with the apparatus defined in claim 8.

According to the invention any glue mixture that is wasted, i.e. that is not applied to an object, will be collected in a collecting vessel or tank, where it is mixed with only one component of the mixture, preferably the glue component. The ratio of "single component":"waste mixture" is preferably larger than 100:20.

Thereby the speed of curing will be so much reduced that the presence of the hardener will not affect the viscosity of the glue to any significant degree. Thereby the need for interrupting the production for cleaning will be eliminated, and essentially no waste will occur.

In one embodiment the ratio is larger than 100:30, whereby adjustment of at least the hardener flow must be performed in order to maintain the desired mixing ratio.

By providing the day tank for e.g. glue component beneath the glue applicator the waste glue mixture is collected and mixed in with the glue component. Thereby it is possible to reuse the waste.

BRIEF DESCRIPTION OF THE DRAWINGS

The Invention will be described below in detail with reference to the attached drawings, in which.

DETAILED DESCRIPTION OF THE INVENTION

For the purpose of this application, the expression "glue mixture" shall mean a two-component or multi-component mixture of glue component and hardener component, and optionally other components.

The expression "glue component" shall be taken to mean any component of a multi-component glue that is not a hardener.

The term "multi-component glue" shall be taken to encompass glues comprising two or more components.

"Hardener" shall be taken to encompass the active component in hardener compositions. I.e. if the active component is diluted to a hardener composition, it will be the amount of active component in said composition that shall be taken in account when determining what ratio waste glue to hardener is at hand in the system.

The invention will now be described with reference to a non-limiting example from manufacturing of construction beams by gluing a number of lamellas on top of each other.

Figure 1:
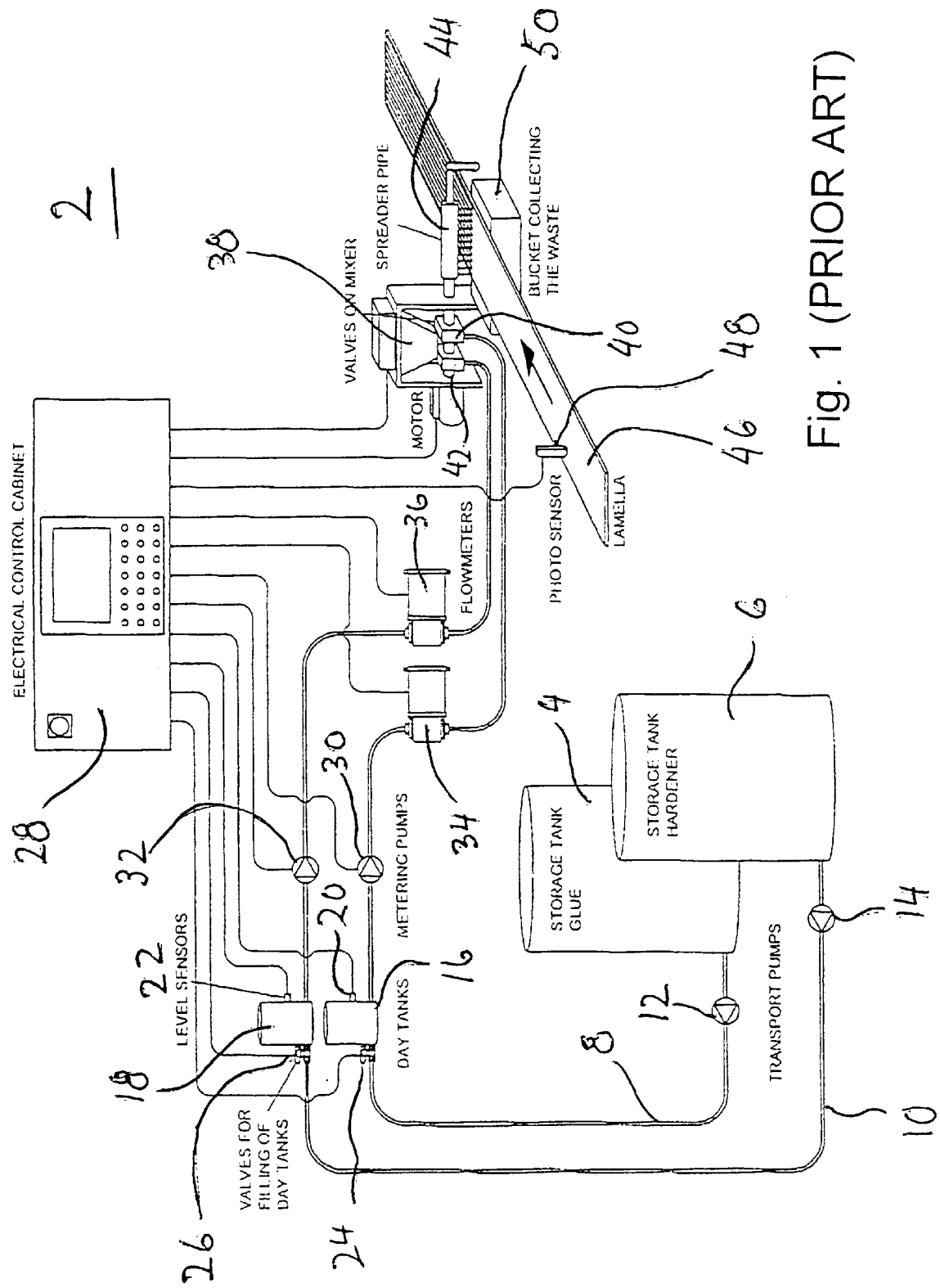
FIG. 1 illustrates a prior art system of the above mentioned first type.

First however, in FIG. 1 there is schematically illustrated a prior art system, generally designated 2, for gluing with a two-component glue.

It comprises storage tanks 4 and 6 for the first component (glue), and the second component (hardener) respectively. There are feeding conduits 8, 10 having transport pumps 12, 14 for the glue and hardener respectively, feeding the material to respective day tanks 16, 18 for glue and hardener, via valves 24, 26. The day tanks are provided with level sensors 20, 22 outputting level signals to a control cabinet 28. In response to a LOW LEVEL signal from the sensors the pumps 12, 14 and valves 24, 26 are activated so as to replenish the day tanks 16, 18. From the day tanks 16, 18 the glue and hardener is fed via metering pumps 30, 32 and flow meter 34, 36 to a mixer 38. The flow meters feed information of the flow to the control cabinet 28, and this feedback is used to control the metering pumps 30, 32. In the mixer 38 there are provided valves 40, 42, by which feed of glue and hardener is started and stopped. The ratio of glue to hardener can be controlled, as desired, by controlling the pumping rates of the pumps 12, 14. Coupled to the mixer 38 there is a spreader pipe 44 for the application of glue mixture to the objects passing under the spreader pipe.

There is provided a feeding mechanism (not shown) for feeding the lamellas 46, such that glue mixture is appropriately applied to it. A position sensor 48 (suitably a photo sensor) is located to detect the leading edge of the lamella 46 when it enters the applicator section. In response to a signal from said sensor the spreader pipe 44 will be activated by the control cabinet with a suitable delay in order that the glue will be appropriately applied to the lamella 46. However, as indicated above in the background section, there will always be some waste at the beginning and end of the application process.

Therefor, beneath the spreader pipe 44 there is provided a vessel or bucket 50 for collecting waste glue mixture.

Figure 2:
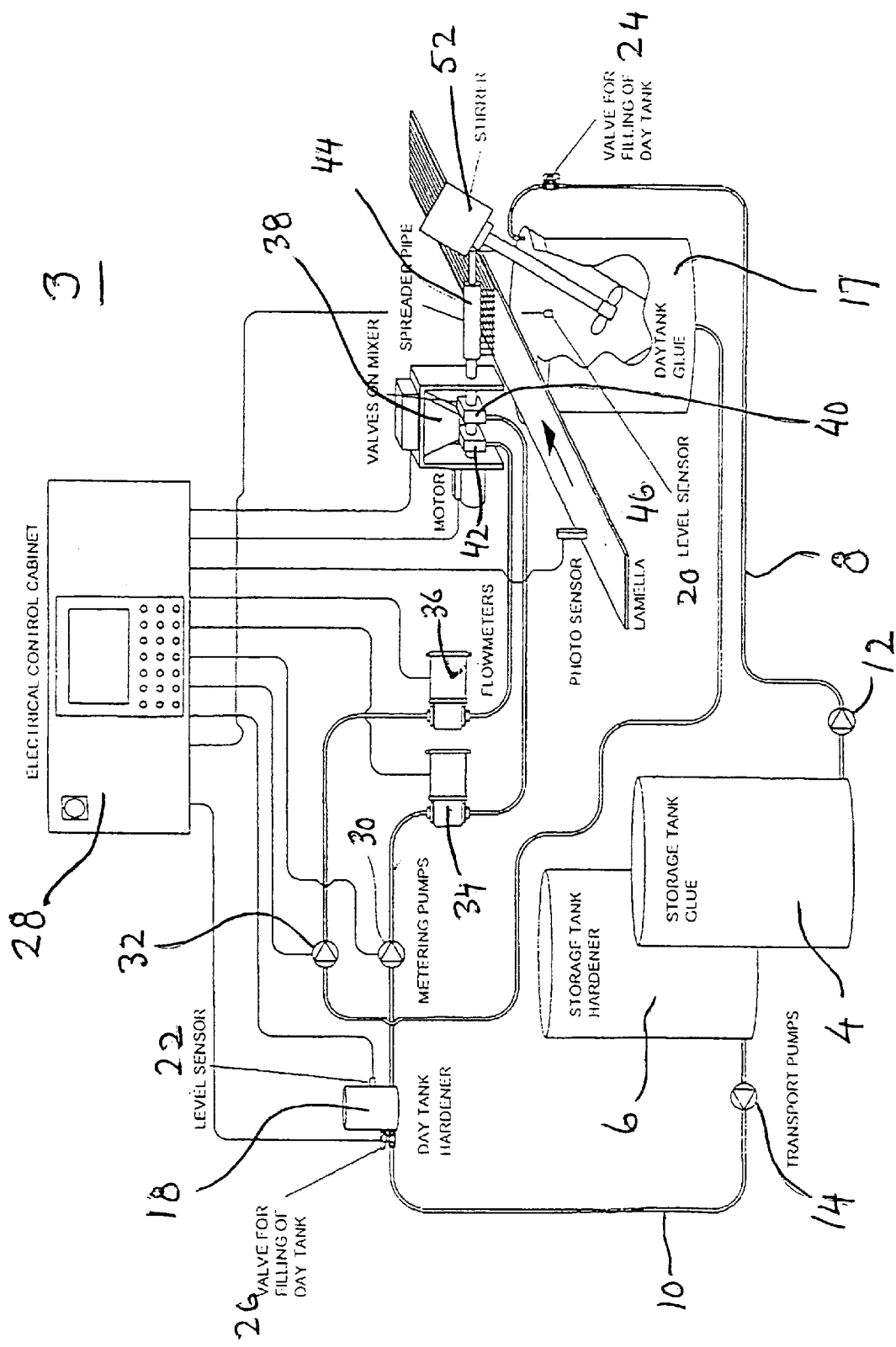
FIG. 2 illustrates a system according to the present invention.

Now the novel and inventive system will be described with reference to FIG. 2. In FIGS. 1 and 2 like elements will have like reference numerals.

Thus, the system according to the invention is generally designated with reference numeral 3.

Like the prior art system shown in FIG. 1 it comprises storage tanks 4 and 6 for the first component (glue), and the second component (hardener) respectively. There are feeding conduits 8, 10 having transport pumps 12, 14 for the glue and hardener, respectively. The pump 14 and conduit 10 feeds the hardener to a day tank 18, which is exactly like the prior art day tank. However, the day tank 17 for glue is differently arranged and comprises the inventive features of the new system. It will be described in further detail below.

The day tanks are provided with level sensors 20, 22 outputting level signals to a control cabinet 28. In response to a LOW LEVEL signal from the sensors the pumps 12, 14 and valves 24, 26 are activated so as to replenish the day tanks 17, 18. From the day tanks 17, 18 the glue and hardener is fed via metering pumps 30, 32 and flow meters 34, 36 to a mixer 38. The flow meters feed information of the flow to the control cabinet 28, and this feedback is used to control the metering pumps 30, 32. In the mixer 38 there are provided valves 40, 42, by which feed of glue and hardener is started and stopped. The ratio of glue to hardener can be controlled, as desired, by controlling the pumping rates of the pumps 12, 14. Coupled to the mixer 38 there is a spreader pipe 44 for the application of glue mixture to the objects passing under the spreader pipe.

There is provided a feeding mechanism (not shown) for feeding the lamellas 46, which is identical to the one described with reference to FIG. 1.

Now the inventive features of the novel system will be described.

As indicated above, the day tank 17 for the glue is different from the prior art. Namely, in the first place it is located beneath the spreader pipe 44 where it replaces the waste collection bucket 50 of the prior art system. Furthermore it comprises a stirrer 52.

In operation the day tank, which suitably contains about 15 liters of glue component, as a nominal filling level, will collect any waste glue mixture that is produced during the gluing operation (15 liters will be consumed in about 10 minutes of operation in average). The stirrer 52 will stir the glue mixture thoroughly such that there will always be a homogenous mixture of waste and fresh material in the day tank 17. In order never to let the amount of waste glue mixture in the day tank 17 exceed a level where the viscosity will be too high, the level sensor 20 will be employed to sense when the day tank 17 should be replenished. The control cabinet automatically carries this out. It is also possible to measure the viscosity directly in the day tank 17, and feed the viscosity information back to the control cabinet. There it can either be automatically processed and the process appropriately adjusted, or the data can be displayed such that the operator can adjust the process manually.

Now a gluing process utilizing the system according to the invention will be described with reference to the system overview in FIG. 2.

The operator will initially select the desired mixing ratio of glue component to hardener component in the two-component mixture that is to be used for the specific situation at hand. Such ratios can vary between 100:13 and 100:30 (corresponding to between 11% by weight of hardener and 23% by weight). Then the pumps 12, 14 are started so as to fill the day tanks 17, 18. While the day tanks are being filled, the stirrer 52 in the glue component day tank 17 is activated. The metering pumps 30, 32 are started and the components are fed to the mixer. The pumping rates of each pump correspond to the desired mixing ratio, by having been adjusted by the control cabinet in response to the operator's initial selection. When a proper mixture has been obtained the first lamella 46 is fed into the applicator section, where the photo sensor senses the presence of the leading edge, which triggers the activation of the mixer/spreader pipe aggregate 38, 44, after a suitable delay, in order not to waste undue amounts of glue mixture. Glue mixture is spread onto the lamellas passing through the applicator station and waste glue mixture is collected in the day tank 17, and mixed with the fresh glue component therein.

As soon as the machine is pumping glue and hardener, the mixer motor 42 will start running and will continue to run a couple of seconds after the pumping has stopped, i.e. after the lamella 46 has exited the applicator station, in response to the position sensor signal. The stirrer 52 in the day tank 17, will run in parallel with the motor 42, during the filling of the tank 17.

The following Example is given as illustration and not as a limitation of the scope of the invention.

EXAMPLE

Let us assume that the waste of glue in the application of glue mixture is 10%. It can of course vary considerably, but 10% is a reasonable average. We also assume that the ratio of glue:hardener in the glue mixture is 100:30 (23% hardener). The glue level in the day tank is 10 kg, which is maintained essentially constant by means of the level sensor, and the feedback from the control cabinet controlling pumps and valves.

When a "steady state" in terms of the ratio between waste glue mixture and glue in the day tank has been reached, there will thus be 9 kg pure glue and 1 kg waste glue mixture in the tank (we assume 10% waste). The waste glue mixture contains 0.23 kg hardener, and thus the concentration of hardener in the day tank will be 0.23/(9+1−0.23) kg=2.35 parts by weight (=2.3%) (corresponding to a ratio 977:23).

Assuming a ratio of glue:hardener of 100:13 yields 1.16 parts by weight (=1.15%) of hardener in the day tank (corresponding to a ratio 9885:115).

The pot life for ratios of hardener in glue in this range is so long that the effect of the presence of hardener can be neglected.

At this "steady state" situation with 1 kg waste in the day tank, the ratio of glue:hardener that is actually being applied will not be the initial 100:30, but in reality 977:323 (=33.1 parts by weight of hardener), and for a nominal ratio of 100:13, the "true" ratio will be 988.5:311.5 (=14.3 parts by weight).

If the actual ratio gets outside the permitted range, because of the glue waste being mixed in, the ratio can be compensated for by changing the flow of the hardener into the mixer accordingly.

It will be possible also to employ higher ratios of waste glue and glue component than the ratio used in the Example. It will be the properties, e.g. the pot life, of the gluing systems employed that decide what ratios are possible. If substantially higher ratios of waste glue and glue component, e.g. 100:30 are used, it will be necessary to adjust or compensate the flow of hardener and glue such that the desired mixing ratio in the glue mixture actually applied to the objects is maintained.

The invention having been thus described, the skilled man will appreciate that it can be varied within the scope of the appended claims. For example, there can be more than two components in the glue mixture, in which case the machine may need to be adapted by the provision of several tanks for the several components.

The glue systems commonly used for the applications indicated herein are MUF (Melamin/Urea/Formaldehyde), PRF (Phenol/Rescorcinol/Urea) and UF (Urea/Formaldehyde) glues. It may also be possible to use EPI (Emulsion Polymer Isocyanate) glues. Any other multi-component glues that meet the criteria of pot life and viscosity required are of course also possible.

What is claimed is:

1. A method of applying a multi-component glue mixture to objects passing through an applicator station for the application of said glue mixture in a manufacturing line, comprising the steps of:
    (a) mixing at least a glue component and a hardener in a mixer to form the glue mixture;
    (b) applying the glue mixture to the objects;
    (c) collecting waste glue mixture from said applying step in a tank;
    (d) mixing in said tank said collected waste glue mixture with a fresh glue component to form a recycle mixture; and
    (e) feeding said recycle mixture to said mixer.

2. The method as claimed in claim 1, wherein said mixing is carried out by stirring.

3. The method of claim 1, wherein the ratio of said fresh glue component to said collected waste glue in said recycle mixture is at all times larger than 100:20.

4. The method as claimed in claim 3, wherein said ratio is at all times larger than 100:10.

5. The method of claim 1, wherein the ratio of said fresh glue component to said collected waste glue in said recycle mixture is such that the viscosity of said recycle mixture never exceeds the viscosity suitable for application of the glue mixture onto said objects.

6. The method as claimed in claim 1, wherein the ratio of said fresh glue component to said collected waste glue in said recycle mixture is at all times larger than 100:30, and wherein the method further comprises the step of adjusting the pumping rate of at least the hardener so as to maintain said ratio.

7. The method as claimed in claim 1, wherein said fresh glue component is fed to said tank from a storage tank so as to maintain a desired level and a desired viscosity.

8. The method as claimed in claim 1, wherein said glue is a two component system comprising said glue component and said hardener.

* * * * *